(12) United States Patent
Pekarsky et al.

(10) Patent No.: US 12,716,481 B2
(45) Date of Patent: Aug. 25, 2026

(54) FILTER ASSEMBLY

(71) Applicant: FILTRAN LLC, Des Plaines, IL (US)

(72) Inventors: Lev Pekarsky, Des Plaines, IL (US); Ibrahim A. Khalil, Des Plaines, IL (US); Karl S. Morgan, Des Plaines, IL (US); Eric Alan Saari, Des Plaines, IL (US)

(73) Assignee: FILTRAN LLC, Des Plaines, IL (US)

( * ) Notice: Subject to any disclaimer, the term of this patent is extended or adjusted under 35 U.S.C. 154(b) by 708 days.

(21) Appl. No.: 17/937,079

(22) Filed: Sep. 30, 2022

(65) Prior Publication Data

US 2024/0110619 A1 Apr. 4, 2024

(51) Int. Cl.
*F16H 57/04* (2010.01)
*B01D 29/01* (2006.01)
(Continued)

(52) U.S. Cl.
CPC ......... *F16H 57/0404* (2013.01); *B01D 29/01* (2013.01); *B01D 29/33* (2013.01); *B01D 35/26* (2013.01); *B01D 35/30* (2013.01); *F16H 57/0436* (2013.01); *B01D 2201/202* (2013.01); *B01D 2201/204* (2013.01); *B01D 2201/303* (2013.01); *B01D 2201/304* (2013.01); *B01D 2201/4076* (2013.01)

(58) Field of Classification Search
CPC . F16H 57/0404; F16H 57/0421; B01D 35/26; B01D 35/30; B01D 35/306; B01D 35/005
See application file for complete search history.

(56) References Cited

U.S. PATENT DOCUMENTS 5,078,106 A * 1/1992 Matsuo .................... F01M 1/02 123/198 C
6,685,829 B1 2/2004 Baumann et al.
(Continued)

FOREIGN PATENT DOCUMENTS

CN 1510253 7/2004
CN 305725958 4/2020
(Continued)

OTHER PUBLICATIONS

Office Action from related Taiwanese Appln. No. 112130300, dated Jul. 10, 2024. English translation attached.
(Continued)

*Primary Examiner* — Benjamin M Kurtz
(74) *Attorney, Agent, or Firm* — Secant IP, PLLC

(57) ABSTRACT

A manifold may include a manifold body and a cap. The manifold body may define a manifold inlet including a first filter holder configured to receive a first filter, a second filter holder having an enclosable open end, the second filter holder configured to receive a second filter through the enclosable open end, a pump interface having an interface inlet and an interface outlet, a manifold outlet, an inlet passageway fluidly coupling the manifold inlet to the interface inlet, an intermediary passageway fluidly coupling the interface outlet to the second filter holder, and an outlet passageway fluidly coupling the second filter holder to the manifold outlet. The cap may be configured to enclose the enclosable open end.

20 Claims, 7 Drawing Sheets

(51) Int. Cl.

| | |
|---|---|
| ***B01D 29/33*** | (2006.01) |
| ***B01D 35/26*** | (2006.01) |
| ***B01D 35/30*** | (2006.01) |

(56) References Cited

U.S. PATENT DOCUMENTS

| | | | |
|---|---|---|---|
| 6,793,812 | B2 | 9/2004 | Caldwell et al. |
| D793,522 | S | 8/2017 | Adey et al. |
| D816,798 | S | 5/2018 | Rayle |
| 10,408,331 | B2 | 9/2019 | Altwies et al. |
| 10,690,234 | B1 | 6/2020 | Oury, Jr. et al. |
| D903,048 | S | 11/2020 | Lu |
| 11,268,482 | B2 | 3/2022 | Tian et al. |
| D954,897 | S | 6/2022 | Downie et al. |
| 2020/0086251 | A1 | 3/2020 | Dom et al. |
| 2021/0199188 | A1 | 7/2021 | Stausberg |
| 2021/0324821 | A1* | 10/2021 | Tian ....................... B01D 29/56 |
| 2022/0289593 | A1 | 9/2022 | Sztykiel et al. |

FOREIGN PATENT DOCUMENTS

| | | |
|---|---|---|
| CN | 112709808 | 4/2021 |
| CN | 113530734 | 10/2021 |
| CN | 307511719 | 8/2022 |
| JP | 7-14109 | 3/1995 |
| WO | 2017/140503 | 8/2017 |

OTHER PUBLICATIONS

Extended European Search Report from related EPO Appln. No. 23190502.7, dated Jan. 30, 2024.

International Search Report and Written Opinion from related PCT Appln. No. PCT/US2023/072065, dated Dec. 12, 2023.

Picture of the bottom view of Chrylser/Mopar Part No. 05184294AE, at least as early as Sep. 23, 2022.

Picture of the label from Chrylser/Mopar Part No. 05184294AE, at least as early as Sep. 23, 2022.

Picture of the Cooler Interface of Chrylser/Mopar Part No. 05184294AE, at least as early as Sep. 23, 2022.

Picture of an oblique view of Chrylser/Mopar Part No. 05184294AE, at least as early as Sep. 23, 2022.

Hengst PF System Advertisement, 2003. English translation attached.

"IBS Filtran Modularization—In Production", Filtran Filtration Group, 2014-2019 Mercedes applications.

Notice of Allowance from corresponding Taiwanese Design Appln. No. 112301477, dated Aug. 21, 2023. English translation attached.

* cited by examiner

FILTER ASSEMBLY

TECHNICAL FIELD

The present disclosure is generally directed to fluid filtration and more specifically to a filter assembly having a plurality of filters.

BACKGROUND INFORMATION

Vehicle drivetrains (e.g., for passenger vehicles or commercial vehicles) may include one or more of an automatic transmission, a manual transmission, and/or an electric drive. The vehicle drivetrain (e.g., the automatic transmission, the manual transmission, and/or the electric drive) may require lubrication and thermal management to function properly and/or reliably. Lubrication and thermal management may be provided by a lubricant (e.g., an oil) that is moved through a lubrication circuit using a pump, wherein the lubrication circuit includes the vehicle drive. Filters may be positioned upstream and/or downstream of the pump to collect contaminants within the lubricant. For example, a first filter may be coupled to an inlet of the pump and a second filter may be coupled to an outlet of the pump. Such an arrangement may result in multiple sealing interfaces (e.g., between the pump inlet and the first filter and between the pump outlet and the second filter). As the number of sealing interfaces increase, the complexity, cost, and/or weight may increase.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a fluid (e.g., a lubricant and/or coolant) filter assembly. A fluid filter assembly may be configured to filter a lubricant and/or a coolant for use with a vehicle drivetrain. For example, a lubricant filter assembly may filter a lubricant that passes through one or more of an automatic transmission, a manual transmission, and/or an electric drive (the lubricant may also be used for heat transfer). In this example, the lubricant filter assembly may include a manifold configured to fluidly couple to a pump. The pump includes a pump inlet and a pump outlet and is configured to cause lubricant to flow through the manifold. The manifold includes a pump interface for fluidly coupling to the pump inlet and the pump outlet, a first filter holder configured to receive a first filter, and a second filter holder configured to receive a second filter. The first filter holder is upstream of the pump inlet and fluidly coupled to the pump inlet through the pump interface. The second filter holder is downstream of the pump outlet and fluidly coupled to the pump outlet through the pump interface.

Figure 1:
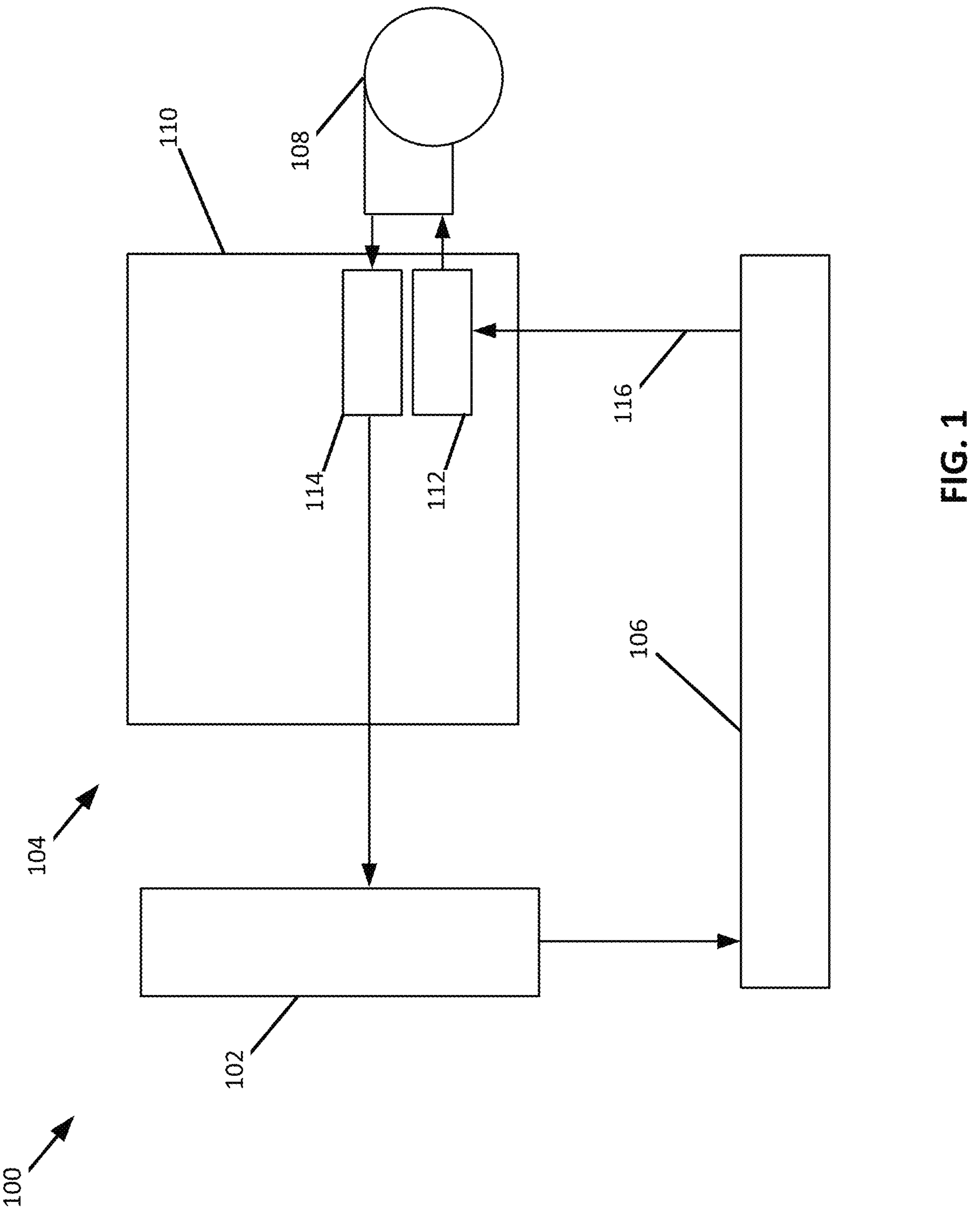
FIG. 1 shows a schematic system diagram of a fluid loop within a vehicle, consistent with embodiments of the present disclosure.

FIG. 1 shows a system diagram 100 including a vehicle drivetrain 102, a fluid (e.g., a lubricant and/or coolant) filter assembly 104, a sump 106, and a pump 108 fluidly coupled to the sump 106. The vehicle drivetrain 102 may include one or more of an automatic transmission, a manual transmission, and/or an electric drive.

As shown, the filter assembly 104 includes a manifold 110 that is fluidly coupled to an inlet and an outlet of the pump 108 and that is fluidly coupled to the sump 106. The manifold 110 includes a first filter 112 upstream of the inlet of the pump 108 and a second filter 114 downstream of the outlet of the pump 108. In other words, the first filter 112 may generally be described as a pre-pump (or suction) filter and the second filter 114 may be generally described as a post pump (or pressure) filter.

In operation, the pump 108 urges fluid to flow from the sump 106 along a fluid path 116. The fluid path 116 extends from the sump 106, through the pump 108, the manifold 110, and the vehicle drivetrain 102, and back into the sump 106. In other words, fluid path 116 may generally be described as a fluid loop (e.g., a lubricant and/or coolant loop). As shown, the first filter 112 is positioned between the sump 106 and the pump 108 along the fluid path 116 and the second filter 114 is positioned between the pump 108 and the vehicle drivetrain 102 along the fluid path 116.

Figure 2:
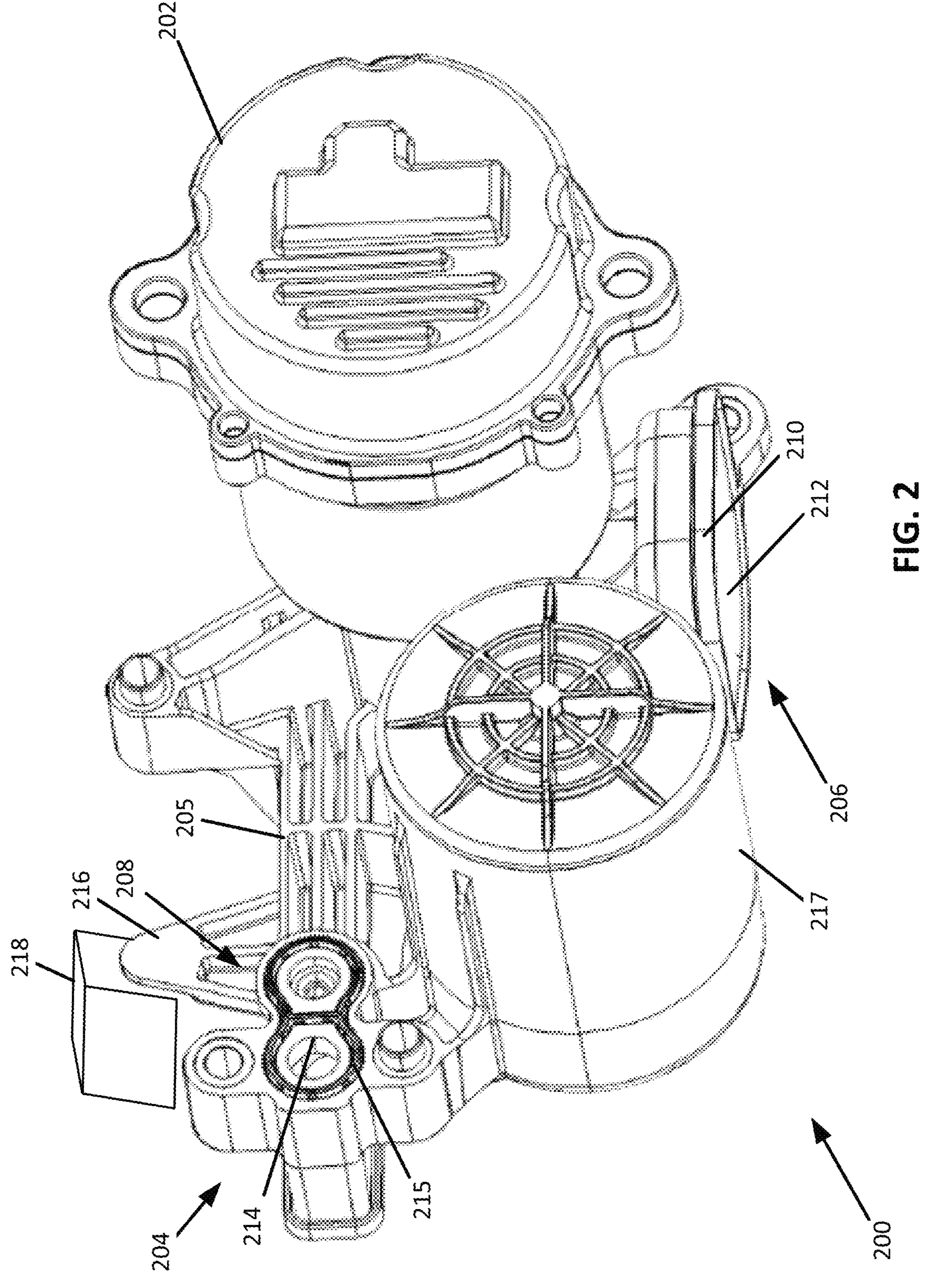
FIG. 2 shows a perspective view of a filter assembly coupled to a pump, consistent with embodiments of the present disclosure.
Figure 3:
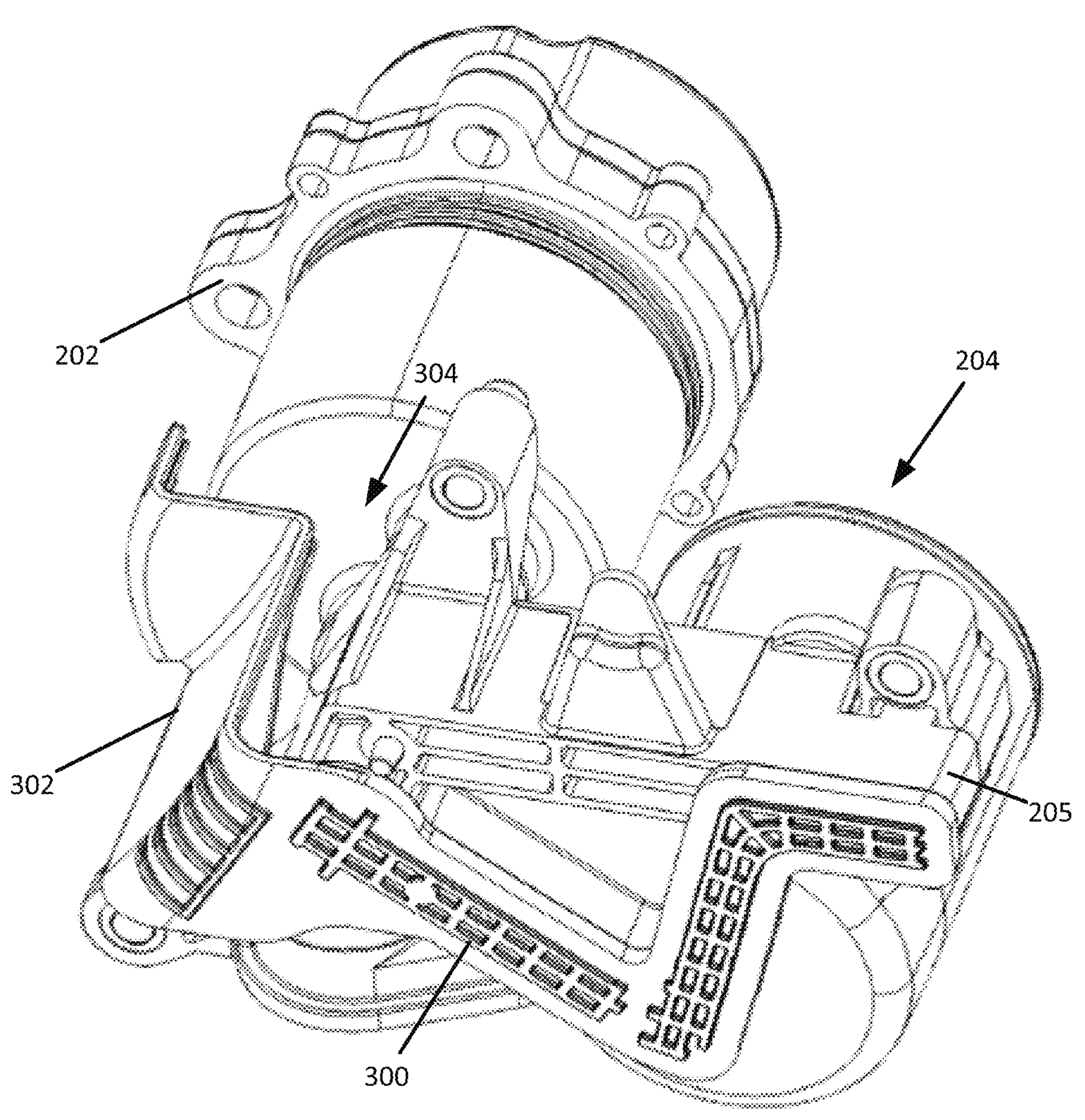
FIG. 3 shows another perspective view of the filter assembly and pump of FIG. 2, consistent with embodiments of the present disclosure.

FIGS. 2 and 3 show perspective views of a filter assembly 200, which is an example of the filter assembly 104 of FIG. 1, fluidly coupled to a pump 202.

With reference to FIG. 2, the filter assembly 200 includes a manifold 204. The manifold 204 is fluidly coupled to the pump 202. The manifold 204 includes a manifold body 205, a manifold inlet 206, and a manifold outlet 208 configured to be fluidly coupled to the manifold inlet 206 through the pump 202. The manifold inlet 206 and the manifold outlet 208 may be at least partially defined by the manifold body 205. The manifold inlet 206 may include (e.g., define) a first filter holder 210 configured to receive a first filter 212. The first filter 212 may be configured as a suction filter. In some instances, there may be a plurality of first filters 212 (e.g., arranged in series or arranged in parallel). Additionally, or alternatively, the first filter 212 may be a multi-part filter.

The first filter 212 may be a mesh filter having, for example, a surface area in a range of 15 square centimeters ($cm^2$) to 50 $cm^2$ and a pore size in a range of 100 microns to 300 microns. By way of further example, the first filter 212 may be a mesh filter having a surface area of about (e.g., within 10% of) 21 $cm^2$ and a pore size of about 200 microns. By way of still further example, the first filter 212 may be a mesh filter having, for example, a surface area in a range of 5 $cm^2$ to 100 $cm^2$. By way of still further example, the first filter 212 may be a mesh filter having, for example, a surface area in a range of 15 $cm^2$ to 30 $cm^2$. By way of still further example, the first filter 212 may be a mesh filter having a surface area of about 80 $cm^2$.

The manifold outlet 208 may include (e.g., define) a flow splitter 214 configured to create two or more separate fluid flow paths (e.g., one for cooling and one for lubrication). The manifold outlet 208 may include a seal 215 (e.g., a press-in-place seal) that is configured to sealingly interface with one or more fluid connectors (e.g., that are configured to convey fluid to a vehicle drivetrain). In some instances, an outlet filter may be provided at the manifold outlet 208. The outlet filter may be configured as a single layer construction (e.g., to mitigate flow restrictions).

As shown, the manifold 204 may also include a second filter holder 217 configured to receive a second filter (e.g., a pressure filter). The second filter holder 217 may be defined by the manifold body 205. The second filter holder 217 is downstream of the pump 202 and first filter holder 210 is upstream of the pump 202. As such, fluid flows through the first filter holder 210 before flowing through the pump 202 and through the pump 202 before flowing through the second filter holder 217. In some instances, there may be a plurality of second filter holders 217 (e.g., arranged in series or arranged in parallel) each being configured to receive a respective second filter.

In some instances, the manifold 204 (e.g., the manifold body 205) may include a bracket 216. The bracket 216 may be integrally formed from the manifold body 205. The bracket 216 is configured to restrict movement of (e.g., engage or contact) an external component 218 (e.g., a component of a drivetrain of a vehicle). Restricting movement of the external component 218 may prevent the external component 218 from becoming dislodged from a vehicle (e.g., as a result of vibration). While the bracket 216 may not interact with fluid that is flowing through the manifold 204, the bracket 216 may result in simplification and/or part count reduction in the drivetrain of the vehicle.

With reference to FIG. 3, the manifold 204 may include a manifold cover 300. The manifold cover 300 may be coupled to the manifold body 205 (e.g., using adhesives, laser welding, spin welding, sonic welding, mechanical fasteners, and/or any other type of coupling). For example, the manifold cover 300 may be non-removably coupled to the manifold body 205 (e.g., removal of the manifold cover 300 results in the manifold 204 being rendered unusable in a manner consistent with the design intent). In some instances, the manifold cover 300 may include (e.g., define) the bracket 216.

As shown, the manifold cover 300 may include a baffle 302. Additionally, or alternatively, the manifold body 205 may include (e.g., define) at least a portion of (e.g., all of) the baffle 302. The baffle 302 may be spaced apart from the manifold body 205 and/or the pump 202 such that a passthrough 304 extends therebetween. For example, and as shown, at least a portion of the baffle 302 may have a shape that generally corresponds to a contour of a portion of the manifold body 205 and/or of a portion of the pump 202. The passthrough 304 may be configured to receive a portion of a moving component (e.g., a chain and/or one or more sprockets of a vehicle drivetrain). The baffle 302 may be configured to reduce churning, aeration, and/or viscous drag losses (e.g., as a result of fluid shedding from the moving component). While the baffle 302 may not interact with fluid that is flowing through the manifold 204, the baffle 302 may result in simplification and/or part count reduction in the drivetrain of the vehicle.

Figure 4:
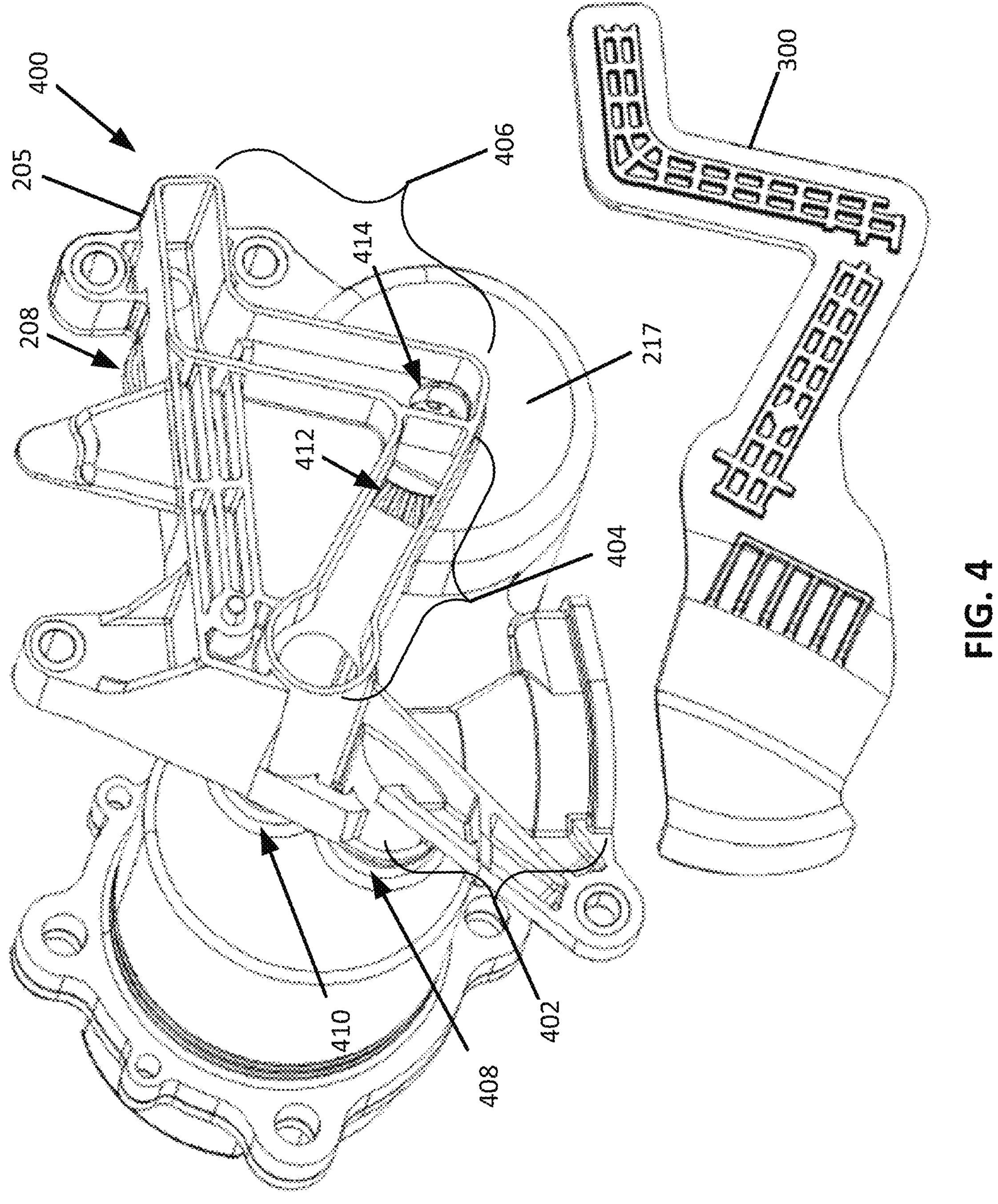
FIG. 4 shows a partial exploded view of the filter assembly and pump of FIG. 2, consistent with embodiments of the present disclosure.

As shown in FIG. 4, the manifold cover 300 may enclose at least a portion of one or more passageways 400 that extend within the manifold body 205. The one or more passageways 400 are configured to convey fluid. In one example, the manifold body 205 may be formed using injection molding such that at least a portion of the one or more passageways 400 are formed from the manifold body 205, wherein at least a portion of a least one of the one or more passageways 400 are open. In this example, the manifold cover 300 may enclose at least a portion of at least one of the one or more passageways 400 when the manifold cover 300 is coupled to the manifold body 205. The one or more passageways 400 may include an inlet passageway 402, an intermediary passageway 404, and an outlet passageway 406. The manifold cover 300 may enclose at least a portion of the intermediary passageway 404 and at least a portion of the outlet passageway 406.

The inlet passageway 402 extends between the manifold inlet 206 and a pump inlet 408 of the pump 202. In other words, the inlet passageway 402 fluidly couples the manifold inlet 206 to the pump inlet 408. The intermediary passageway 404 extends between a pump outlet 410 of the pump 202 and a filter inlet 412 of the second filter holder 217. In other words, the intermediary passageway 404 fluidly couples the pump outlet 410 to the filter inlet 412 of the second filter holder 217. The outlet passageway 406 extends between a filter outlet 414 of the second filter holder 217 and the manifold outlet 208. In other words, the outlet passageway 406 fluidly couples the filter outlet 414 of the second filter holder 217 to the manifold outlet 208.

Figure 5:
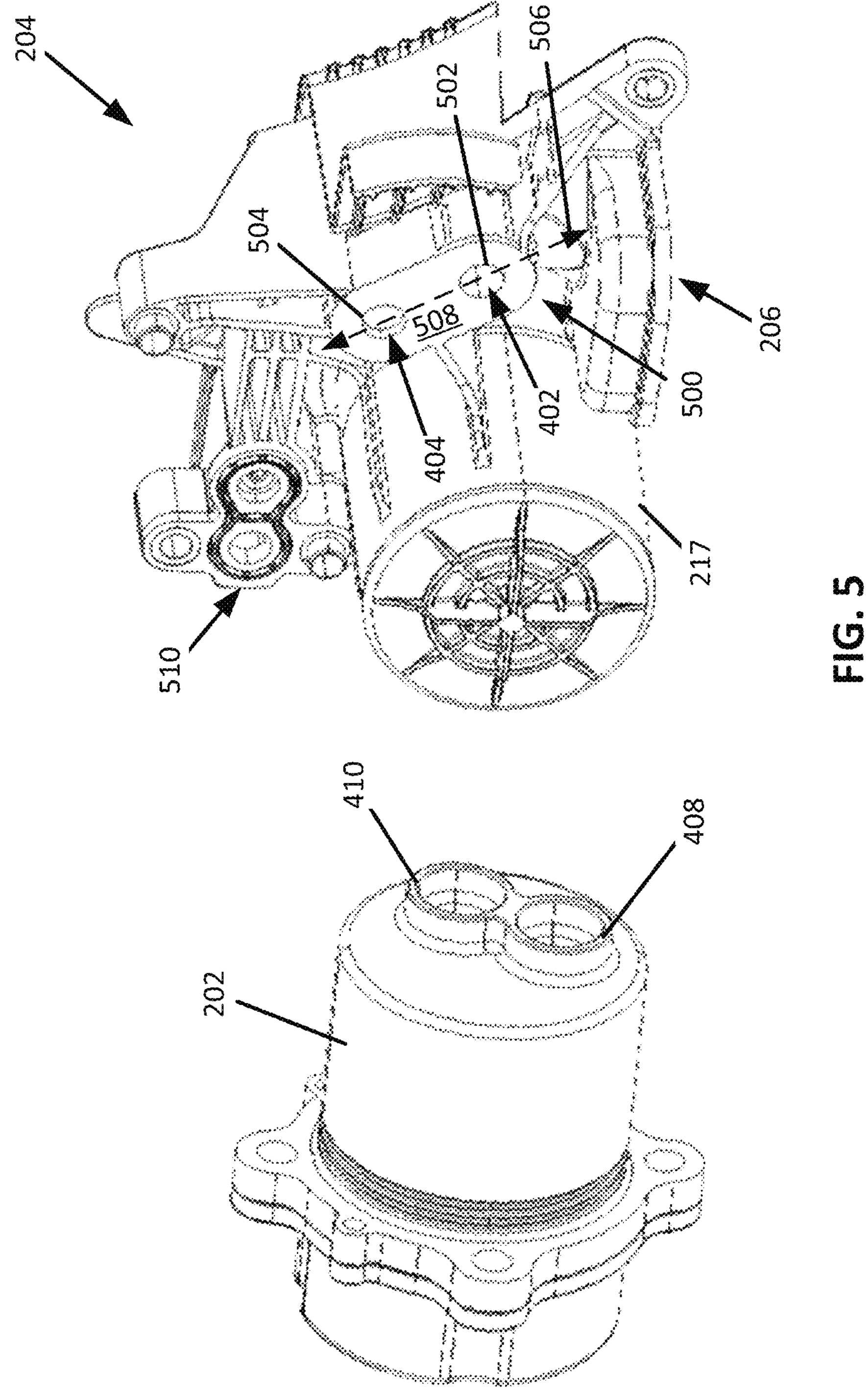
FIG. 5 shows another partial exploded view of the filter assembly and pump of FIG. 2, consistent with embodiments of the present disclosure.

FIG. 5 shows the pump 202 separated from the manifold 204. As shown, the manifold body 205 defines a pump interface 500 configured to fluidly couple with the pump 202. The pump interface 500 includes an interface inlet 502 and an interface outlet 504. As shown, the interface inlet 502 and interface outlet 504 may be spaced apart along a longitudinal axis 506 of the pump interface 500 and arranged in a common plane. For example, the longitudinal axis 506 may be a central longitudinal axis and may intersect the center of the interface inlet 502 and the interface outlet 504.

The interface inlet 502 is configured to fluidly couple with the pump inlet 408 and the interface outlet 504 is configured to fluidly couple with the pump outlet 410. As such, the inlet passageway 402 extends between the manifold inlet 206 and the interface inlet 502, fluidly coupling the manifold inlet 206 to the interface inlet 502, and the intermediary passageway 404 extends between the interface outlet 504 and the filter inlet 412 (FIG. 4), fluidly coupling the interface outlet 504 with the second filter holder 217. When the manifold 204 is coupled with the pump 202, the pump 202 fluidly couples the inlet passageway 402 to the intermediary passageway 404 such that fluid is capable of flowing from the inlet passageway 402 through the pump 202 and into the intermediary passageway 404.

The pump interface 500 further defines an interface sealing surface 508 configured to directly or indirectly mate with a corresponding surface of the pump 202. For example, a seal (e.g., a compression seal) may be positioned along the interface sealing surface 508 such that the pump 202 sealingly engages with the seal when coupled with the manifold 204. As shown, the interface sealing surface 508 extends around the interface inlet 502 and the interface outlet 504. The interface sealing surface 508 may be substantially (e.g., within 1° of, 2° of, 3° of, 4° of, or 5° of) parallel to an outlet sealing surface 510 that extends around the manifold outlet 208.

Figure 6:
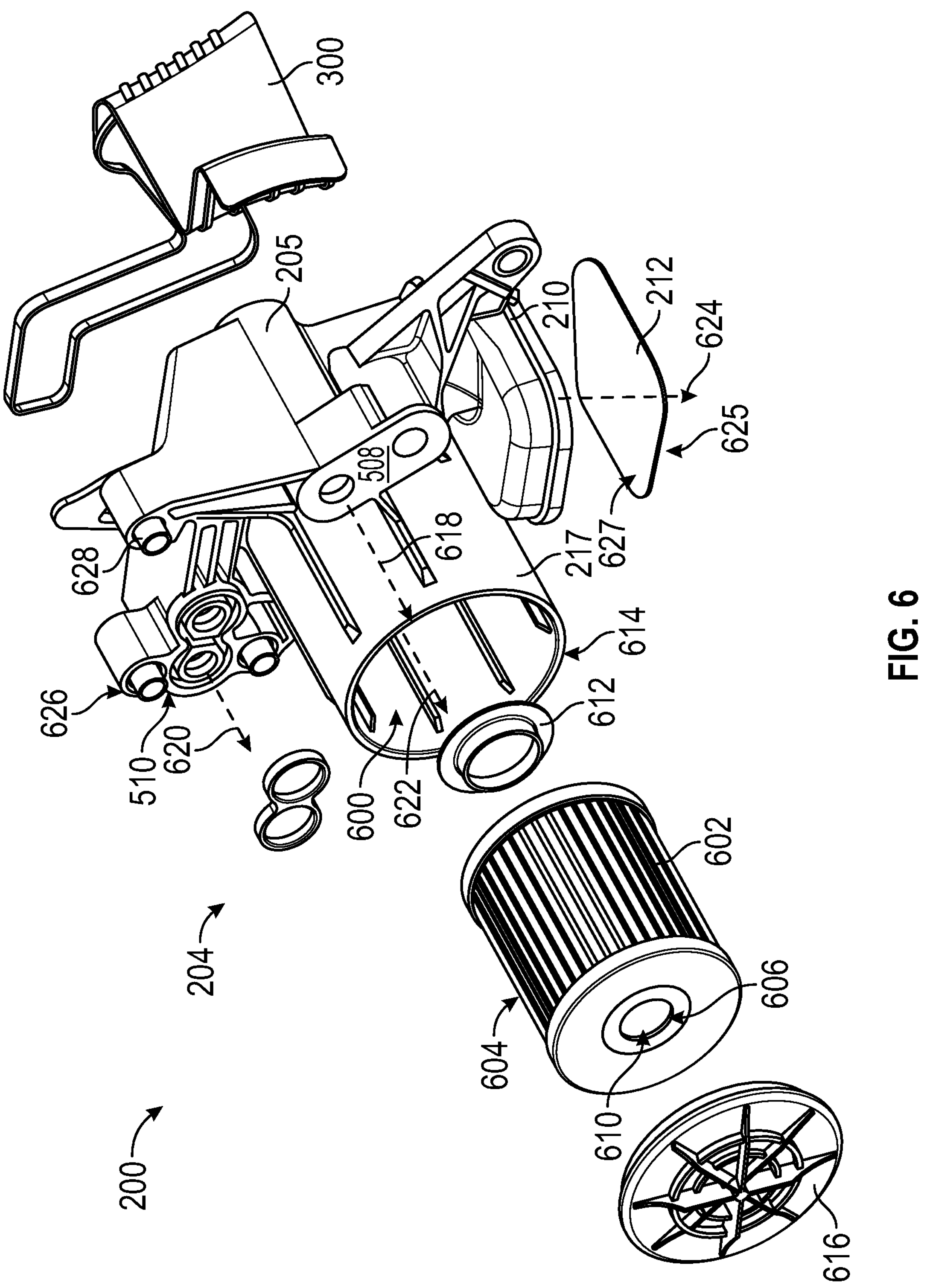
FIG. 6 shows an exploded view of the filter assembly of FIG. 2, consistent with embodiments of the present disclosure.

FIG. 6 shows an exploded view of the filter assembly 200. As shown, the second filter holder 217 defines a filter cavity 600 configured to receive a second filter 602. The filter cavity 600 may have a shape (e.g., a cylindrical shape) that corresponds to a shape of the second filter 602 (e.g., a cylindrical shape). The second filter 602 may be configured such that fluid passes from an outer filter surface 604 to an inner filter surface 606, wherein the inner filter surface 606 defines a filter fluid passage 610 that directs fluid through the filter outlet 414 (FIG. 4). A filter seal 612 may be disposed around the filter outlet 414. The second filter 602 may be configured as a pressure filter. In some instances, there may be a plurality of second filters 602 (e.g., arranged in series or arranged in parallel).

In some instances, flow through the second filter 602 may be restricted (e.g., as a result of debris buildup and/or high fluid viscosity). In these instances, the second filter 602 may be bypassed. For example, there may be a pressure sensitive bypass valve that is configured to allow fluid to bypass the second filter 602 and/or the second filter 602 may be configured include a bypass functionality.

The second filter holder 217 may include an enclosable open end 614 that is configured to receive the second filter 602. For example, the filter cavity 600 of the second filter holder 217 may define the enclosable open end 614, wherein the second filter 602 passes through the enclosable open end 614 when being inserted into the filter cavity 600 of the second filter holder 217. A cap 616 is configured to enclose the enclosable open end 614. The cap 616 can be configured to be coupled to second filter holder 217 using one or more of adhesives, sonic welding, laser welding, spin welding, mechanical fasteners (e.g., threaded coupling), and/or any other type of coupling. In some instances, the cap 616 may be configured to be non-removably coupled to the second filter holder 217 (e.g., removal of the cap 616 results in the manifold 204 being rendered unusable in a manner consistent with the design intent).

As shown, the cap 616 and the manifold cover 300 are on opposing sides of the manifold body 205. As also shown, the enclosable open end 614 and the sealing surfaces 508 and 510 face in the same direction. In some instances, two or more of (e.g., each of) an interface axis 618 that extends perpendicular to the interface sealing surface 508, an outlet axis 620 that extends perpendicular to the outlet sealing surface 510, and a second filter holder axis 622 of the second filter holder 217 (e.g., a longitudinal axis of the second filter holder 217) may each be substantially parallel to each other. In some instances, at least one of the interface axis 618, the outlet axis 620, and/or the second filter holder axis 622 may be substantially perpendicular to at least one other of the interface axis 618, the outlet axis 620, and/or the second filter holder axis 622. For example, the second filter holder axis 622 may be substantially perpendicular to the outlet axis 620. By way of further example, the interface axis 618 may be substantially perpendicular to the outlet axis 620. By way of still further example, the second filter holder axis 622 may be substantially perpendicular to the interface axis 618.

A first filter holder axis 624 of the first filter holder 210 (e.g., an axis extending substantially perpendicular to an inlet side 625 and an outlet side 627 of the first filter 212 when the first filter 212 is received within the first filter holder 210) may be substantially perpendicular to one or more of (e.g., each of) the interface axis 618, the outlet axis 620, and/or the second filter holder axis 622. As shown, the manifold body 205 is a monolithic body (e.g., a single injection molded part) that defines the first filter holder 210, the second filter holder 217, the pump interface 500, the manifold outlet 208 (FIG. 2), and at least a portion of the one or more passageways 400 (FIG. 4).

The manifold body 205 may further define one or more mounting openings 626. The one or more mounting openings 626 may include a bushing 628. At least one bushing 628 may be a locating bushing.

Figure 7:
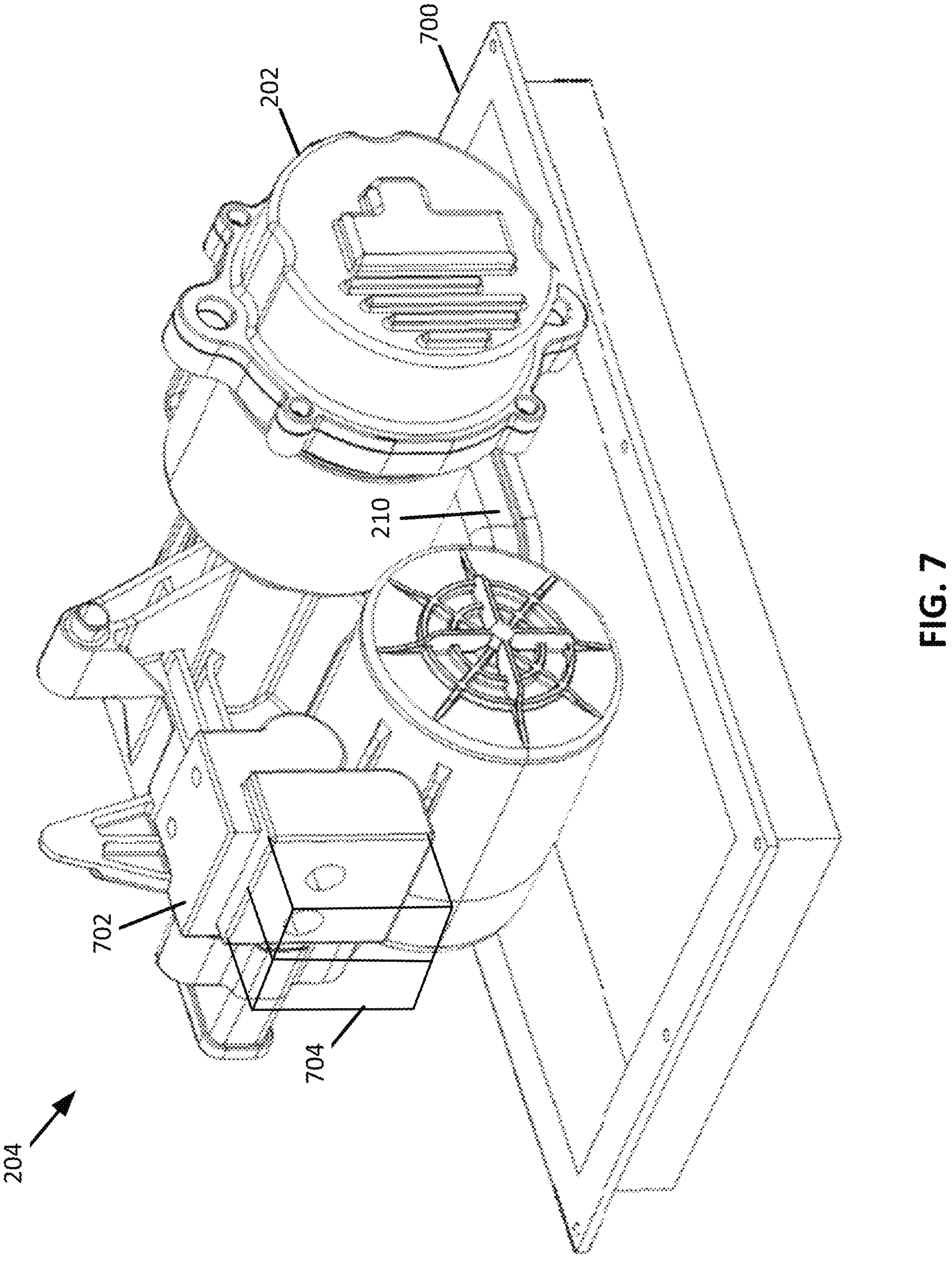
FIG. 7 shows a perspective view of the filter assembly and pump of FIG. 2 in a schematic example environment, consistent with embodiments of the present disclosure.

FIG. 7 shows a perspective view of the manifold 204 coupled to the pump 202 in a schematic example environment. As shown, the first filter holder 210 faces a sump 700 configured to hold a fluid therein. The pump 202 is configured to cause fluid within the sump 700 to enter the manifold 204 through first filter holder 210. After passing through the manifold 204, the pump 202 urges fluid through the manifold outlet 208 and into a fluid connector 702 that directs the fluid to a component 704 (shown as transparent for purposes of clarity) of a vehicle (e.g., a drivetrain).

An example of a manifold, consistent with the present disclosure, may include a manifold body and a cap. The manifold body may define a manifold inlet including a first filter holder configured to receive a first filter, a second filter holder having an enclosable open end, the second filter holder configured to receive a second filter through the enclosable open end, a pump interface having an interface inlet and an interface outlet, a manifold outlet, an inlet passageway fluidly coupling the manifold inlet to the interface inlet, an intermediary passageway fluidly coupling the interface outlet to the second filter holder, and an outlet passageway fluidly coupling the second filter holder to the manifold outlet. The cap may be configured to enclose the enclosable open end.

In some instances, the manifold may further include a manifold cover coupled to manifold body, enclosing at least a portion of the intermediary passageway and at least a portion of the outlet passageway. In some instances, the cap and the manifold cover may be on opposing sides of the manifold body. In some instances, the manifold cover may include a baffle that is spaced apart from the manifold body such that a passthrough extends therebetween. In some instances, the manifold may further include the first and the second filters. In some instances, an interface axis may be substantially parallel to an outlet axis, the interface axis extending perpendicular to an interface sealing surface of the pump interface and the outlet axis extending perpendicular to an outlet sealing surface of the manifold outlet. In some instances, a second filter holder axis may be substantially parallel to the interface axis and the outlet axis, the second filter holder axis being a longitudinal axis of the second filter holder. In some instances, a first filter holder axis may extend substantially perpendicular to the interface axis and the outlet axis, the first filter holder axis extending substantially perpendicular to an inlet side and an outlet side of the first filter when the first filter is received within the first filter holder. In some instances, the manifold outlet may include a flow splitter configured to create two or more separate fluid flow paths. In some instances, the cap may be configured to be non-removably coupled to the second filter holder. In some instances, the manifold body may further include a bracket configured to restrict movement of an external component. In some instances, the interface inlet and the interface outlet may be spaced apart along a longitudinal axis of the pump interface and arranged in a common plane. In some instances, the longitudinal axis may be a central longitudinal axis that intersects the center of the interface inlet and the interface outlet.

An example of a filtration system, consistent with the present disclosure, may include a sump, a pump fluidly coupled to the sump, and a manifold fluidly coupled to the sump and the pump. The manifold may include a manifold body, a first filter, and a second filter. The manifold body may define a manifold inlet including a first filter holder, a second filter holder, a pump interface configured to fluidly couple with the pump, a manifold outlet, an inlet passageway fluidly coupling the manifold inlet to the pump, an intermediary passageway fluidly coupling the pump to the second filter holder, and an outlet passageway fluidly coupling the second filter holder to the manifold outlet. The first filter may be disposed within the first filter holder and the second filter may be disposed within the second filter holder.

In some instances, the first filter holder may face the sump. In some instances, the manifold may further include a manifold cover coupled to manifold body, enclosing at least a portion of the intermediary passageway and at least a portion of the outlet passageway. In some instances, the manifold cover may include a baffle that is spaced apart from the manifold body and the pump such that a passthrough extends therebetween. In some instances, an interface axis may be substantially parallel to an outlet axis, the interface axis extending perpendicular to an interface sealing surface of the pump interface and the outlet axis extending perpendicular to an outlet sealing surface of the manifold outlet. In some instances, a second filter holder axis may be substantially parallel to the interface axis and the outlet axis, the second filter holder axis being a longitudinal axis of the second filter holder. In some instances, the manifold body may further include a bracket configured to restrict movement of an external component.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A manifold comprising:

a monolithic manifold body, the monolithic manifold body defining:

a manifold inlet including a first filter holder configured to receive a first filter;

a second filter holder having an enclosable open end, the second filter holder configured to receive a second filter through the enclosable open end;

a pump interface having an interface inlet and an interface outlet;

a manifold outlet;

an inlet passageway fluidly coupling the manifold inlet to the interface inlet;

an intermediary passageway fluidly coupling the interface outlet to the second filter holder; and an outlet passageway fluidly coupling the second filter holder to the manifold outlet;

a cap configured to enclose the enclosable open end; and a manifold cover coupled to the monolithic manifold body, enclosing at least a portion of the intermediary passageway and at least a portion of the outlet passageway.

2. The manifold of claim 1, wherein the cap and the manifold cover are on opposing sides of the monolithic manifold body.

3. The manifold of claim 1, wherein the manifold cover includes a baffle that is spaced apart from the monolithic manifold body such that a passthrough extends therebetween.

4. The manifold of claim 1 further comprising the first and the second filters.

5. The manifold of claim 1, wherein an interface axis is substantially parallel to an outlet axis, the interface axis extending perpendicular to an interface sealing surface of the pump interface and the outlet axis extending perpendicular to an outlet sealing surface of the manifold outlet.

6. The manifold of claim 5, wherein a second filter holder axis is substantially parallel to the interface axis and the outlet axis, the second filter holder axis being a longitudinal axis of the second filter holder.

7. The manifold of claim 5, wherein a first filter holder axis extends substantially perpendicular to the interface axis and the outlet axis, the first filter holder axis extending substantially perpendicular to an inlet side and an outlet side of the first filter when the first filter is received within the first filter holder.

8. The manifold of claim 1, wherein the manifold outlet includes a flow splitter configured to create two or more separate fluid flow paths.

9. The manifold of claim 1, wherein the cap is configured to be non-removably coupled to the second filter holder.

10. The manifold of claim 1, wherein the monolithic manifold body further includes a bracket configured to restrict movement of an external component.

11. The manifold of claim 1, wherein the interface inlet and the interface outlet are spaced apart along a longitudinal axis of the pump interface and arranged in a common plane.

12. The manifold of claim 11, wherein the longitudinal axis is a central longitudinal axis that intersects the center of the interface inlet and the interface outlet.

13. A filtration system comprising:

a sump;

a pump fluidly coupled to the sump; and a manifold fluidly coupled to the sump and the pump, the manifold including:

a monolithic manifold body, the monolithic manifold body defining:

a manifold inlet including a first filter holder;

a second filter holder;

a pump interface configured to fluidly couple with the pump;

a manifold outlet;

an inlet passageway fluidly coupling the manifold inlet to the pump;

an intermediary passageway fluidly coupling the pump to the second filter holder; and an outlet passageway fluidly coupling the second filter holder to the manifold outlet;

a first filter disposed within the first filter holder;

a second filter disposed within the second filter holder; and wherein the manifold further includes a manifold cover coupled to the monolithic manifold body, enclosing at least a portion of the intermediary passageway and at least a portion of the outlet passageway.

14. The filtration system of claim 13, wherein the first filter holder faces the sump.

15. The filtration system of claim 13, wherein the manifold cover includes a baffle that is spaced apart from the monolithic manifold body and the pump such that a passthrough extends therebetween.

16. The filtration system of claim 13, wherein an interface axis is substantially parallel to an outlet axis, the interface axis extending perpendicular to an interface sealing surface of the pump interface and the outlet axis extending perpendicular to an outlet sealing surface of the manifold outlet.

17. The filtration system of claim 16, wherein a second filter holder axis is substantially parallel to the interface axis and the outlet axis, the second filter holder axis being a longitudinal axis of the second filter holder.

18. The filtration system of claim 13, wherein the monolithic manifold body further includes a bracket configured to restrict movement of an external component.

19. The filtration system of claim 13, wherein the monolithic manifold body is an injection molded manifold body.

20. The manifold of claim 1, wherein the monolithic manifold body is an injection molded manifold body.

* * * * *